Patented May 2, 1933

1,907,246

UNITED STATES PATENT OFFICE

WILLIAM J. HALE AND EDGAR C. BRITTON, OF MIDLAND, MICHIGAN, ASSIGNORS TO THE DOW CHEMICAL COMPANY, OF MIDLAND, MICHIGAN, A CORPORATION OF MICHIGAN

PRODUCTION OF PHENYL PHENOLS

No Drawing. Application filed February 1, 1930. Serial No. 425,347.

The present invention relates to methods for the control of the production of phenyl phenols in the reaction between a monohalogenated aromatic hydrocarbon and an aqueous caustic alkali solution when heated under pressure at an elevated temperature. In a paper by the present applicants (cf. Ind. Eng. Chem. 20; 114, (1928)) describing the preparation of phenol by the alkaline hydrolysis of chlorobenzene it was briefly stated that the tar left in the phenol purification stills contained ortho- and para-phenyl phenols. The two last-named compounds have been found valuable for a variety of purposes. It accordingly becomes desirable to devise a modified form of procedure for reacting chlorobenzene or other mono-halogenated benzene with an aqueous caustic alkali for the purpose of increasing the yield of phenyl phenols obtainable thereby. The invention, then, has for an object the accomplishment of the foregoing result by the improved procedure hereinafter fully described and particularly pointed out in the claims, the following description setting forth but a few of the various ways in which the principle of the invention may be used.

The formation of phenol by heating chlorobenzene with aqueous sodium hydroxide solution under pressure to a temperature between about 300° and 400° C., as is well known, takes place according to the following Equation (1), the immediate product, of course, being sodium phenate;

(1) $C_6H_5Cl + 2NaOH \rightarrow C_6H_5ONa + NaCl + H_2O$

While Equation (1) represents the principal reaction, secondary reactions between chlorobenzene and the sodium phenate product also lead to a more or less considerable formation of the secondary products diphenyl oxide and sodium ortho- and para-phenyl phenate, respectively, in accordance with Equations (2) and (3);

(2) $C_6H_5Cl + C_6H_5ONa \rightarrow C_6H_5OC_6H_5 + NaCl$ (3) $C_6H_5Cl + C_6H_5ONa + NaOH \rightarrow C_6H_5.C_6H_4ONa + NaCl + H_2O$ For present purposes it is desirable to repress Reaction (2) as much as possible and to establish conditions most favorable to Reaction (3). The control of diphenyl oxide formation may be accomplished by initially adding to the reaction mixture an amount thereof corresponding to that which would normally be formed in the reaction, as described in our prior Patent 1,607,618, reissued as No. 18,129, whereby a condition of equilibrium with respect to diphenyl oxide is artificially established in the reaction mixture and the further formation of such compound is substantially prevented.

As regards the formation of ortho- and para-phenyl phenols, according to Equation (3), this is believed to be due to a transformation of the hydroxylic form of the phenate to a tautomeric keto form, as indicated by the following structural formulae:

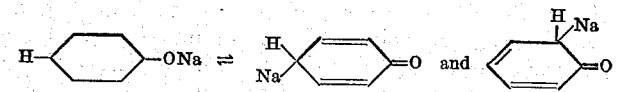

Such rearrangement would create a highly reactive type of structure, so that in the presence of chlorobenzene combination occurs with the attachment of the phenyl group to a nuclear C atom rather than to the O atom, thus:

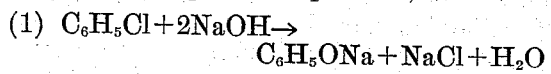

It remains, therefore, to discover the conditions favorable to the tautomeric conversion of the phenate and to apply such conditions to the general process for reacting chlorobenzene and an aqueous sodium hydroxide solution.

We have found that increasing the concentration of the sodium hydroxide solution is markedly effective in increasing the formation of phenyl phenols. According to the general practice heretofore the strength of sodium hydroxide solution employed in the reaction was from 8 to 12 per cent. By increasing the strength to from 15 to 25 per cent. the formation of the tar from which the phenyl phenols are extracted may be increased from about 5 per cent. to as much as 20 per cent. or more of the crude phenol produced. The influence of the reaction temperature is also of significance, the higher temperatures within the practicable operating range having been found to promote the formation of phenyl phenols. In general the most favorable temperature range is between 350° and 420° C., higher temperatures than the foregoing not being feasible on account of the decomposition of the phenol products. It also appears that advantage is gained by heating the primary reacting materials separately to the reaction temperature before they are brought together. The rapid reaction rate thereby attained is more conducive to phenyl phenol formation than when the materials are mixed at a lower temperature and then heated up together during a time interval when reaction is proceeding at a slower rate.

In carrying out our improved method or process we introduce under pressure chlorobenzene and a 12 to 25 per cent. aqueous sodium hydroxide solution, in the proportion of 1 mole of the former to from 2 to 3 moles of the latter, preferably preheated separately to a temperature of 350° C. or somewhat higher, into a suitable autoclave wherein the temperature is maintained between 350° and 420° C., the reaction being completed in from 30 minutes to one hour. The reacted mixture is discharged with release of pressure into a suitable closed container, cooled and acidified to liberate phenol. The crude phenol layer which separates from the aqueous layer is decanted off. The aqueous layer is boiled to distill off with steam a small amount of phenol dissolved therein, and the phenol so separated is combined with the main body thereof previously separated. The crude phenol is then distilled under reduced pressure to separate, first, unreacted chlorobenzene, if any, then the phenol. The still residue is then transferred to another still and the distillation continued, taking off first diphenyl oxide and finally phenyl phenols. The final separation of ortho- and para-phenyl phenol and purification thereof may be carried out, for instance, by the method described in the patent application of E. C. Britton, Serial No. 319,170, filed November 13, 1928, now Patent No. 1,836,307.

The following specific example will serve to illustrate in further detail the principle of our invention.

Example 1

Chlorobenzene was reacted with an 18 per cent. sodium hydroxide solution, in proportion of 1 mole of the former to about 2¼ moles of the latter, under pressure at approximately 370° C. The reaction was carried out in a continuous type of tubular steel reactor, the reaction time being approximately ½ hour. The yield of phenyl phenols amounted to 8 per cent. of the yield of phenol.

Example 2

The reaction was conducted similarly to Example (1), except that a 15 per cent. sodium hydroxide solution was used, and the temperature was held at 390° to 400° C. The yield of phenyl phenols was 14 per cent. of that of phenol.

It is seen that, by employing a stronger caustic alkali solution for the hydrolysis, a materially increased yield of phenyl phenols is realized. The influence of the higher reaction temperatures in still further increasing the yield of phenyl phenols is also shown. While the working up of the mixture of ortho- and para-phenyl phenols obtained thereby for separating the individual compounds does not form a part of this invention, it has been observed that the yield of the ortho-compound relative to the para-compound rises progressively as the strength of the caustic alkali solution is increased. For instance, when chlorobenzene is hydrolyzed with an 8 per cent. sodium hydroxide solution at a temperature around 375° C. the proportion of ortho- to para-phenyl phenol in the mixture thereof that is recovered from the reaction product is about 1 to 3. On the other hand, employing an 18 per cent. sodium hydroxide solution under analogous conditions the proportions are substantially reversed, becoming about 3 to 1.

As already indicated in the equations given above, the formation of secondary products in the alkaline hydrolysis of chlorobenzene probably results from interaction of the primary phenate product with unreacted chlorobenzene. Accordingly the velocity of the primary reaction determines the extent to which secondary products are formed, a high reaction velocity tending to prevent the secondary reactions while a lower velocity, on the other hand, tends to promote such secondary reactions. For example, in conformity with the well known catalytic action of copper in reactions of the present character, as set forth by Ullmann and others, we have found that metallic copper speeds up Reaction (1) to such extent that Reaction (3) is largely forestalled, owing to the rapid depletion of chlorobenzene in the reaction mixture. Conversely, we have found that by employing means to slow down the velocity of Reaction (1), of course within the temperature range necessary for phenyl phenol formation, a corresponding increase in Reaction (3) is brought about. Thus the presence of metals of the iron group, while exerting no catalytic effect upon the hydrolysis of chlorobenzene, coincidentally subserves the greater production of phenyl phenol relative to phenol. A further means for creating conditions favorable to Reaction (3) consists in introducing the chlorobenzene gradually into the alkaline reaction mixture which is maintained at the desired temperatures, between about 370° and 420° C., the chlorobenzene also being preferably preheated to about the same temperature.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method for increasing the yield of phenyl phenols in the alkaline hydrolysis of chlorobenzene which comprises separately preheating under pressure chlorobenzene and a 12 to 25 per cent aqueous sodium hydroxide solution to a temperature between 350° and 420° C., intermixing the same in proportion of 1 mole of chlorobenzene to from 2 to 3 moles sodium hydroxide, reacting the mixture while maintaining the temperature between the stated limits and recovering phenyl phenols from the reaction product.

2. The method for increasing the yield of phenyl phenols in the alkaline hydrolysis of chlorobenzene which comprises separately preheating chlorobenzene and a 12 to 25 per cent aqueous sodium hydroxide solution under pressure to a temperature of approximately 350° C., intermixing the same in proportion of 1 mole chlorobenzene to from 2 to 3 moles sodium hydroxide, maintaining the mixture at a temperature between 350° and 420° C. while reaction proceeds, acidifying the reaction product and separating phenol and phenyl phenols from the resulting phenolic product.

3. The method for increasing the yield of phenyl phenols in the alkaline hydrolysis of chlorobenzene which comprises separately preheating chlorobenzene and a 12 to 25 per cent aqueous sodium hydroxide solution under pressure to a temperature of approximately 350° C., intermixing the same in proportion of 1 mole chlorobenzene to from 2 to 3 moles sodium hydroxide, maintaining the mixture at a temperature between 350° and 420° C. while reaction proceeds, acidifying the reaction product, distilling the resulting phenolic product to separate phenol and recovering phenyl phenols from the distillation residue.

4. The method for increasing the yield of phenyl phenols in the alkaline hydrolysis of chlorobenzene which comprises heating a 12 to 25 per cent aqueous sodium hydroxide solution to a temperature between 350° and 420° C. under pressure, introducing chlorobenzene thereto in proportion of 1 mole of chlorobenzene to from 2 to 3 moles sodium hydroxide and at such rate as to maintain the temperature of the mixture between the stated limits while reaction proceeds, acidifying the reaction product, distilling the resulting phenolic product to separate phenol and recovering phenyl phenols from the distillation residue.

5. In a method for the alkaline hydrolysis of chlorobenzene wherein the latter is heated under pressure at a temperature between 370° and 420° C. with an approximately 12 to 25 per cent aqueous sodium hydroxide solution in the proportion of 1 mole of chlorobenzene to from 2 to 3 moles of sodium hydroxide, the steps which consist in acidifying the reaction product, separating phenolic compounds therefrom, distilling such phenolic compounds to separate phenol and recovering phenyl phenols from the still residue.

Signed by us, this 31st day of January, 1930.

WILLIAM J. HALE.
EDGAR C. BRITTON.